(12) United States Patent
Kawashima et al.

(10) Patent No.: US 11,984,607 B2
(45) Date of Patent: May 14, 2024

(54) GAS DIFFUSION LAYER, MEMBRANE ELECTRODE ASSEMBLY, FUEL CELL, AND MANUFACTURING METHOD OF GAS DIFFUSION LAYER

(71) Applicant: Panasonic Corporation, Osaka (JP)

(72) Inventors: Tsutomu Kawashima, Nara (JP); Yoko Yamamoto, Osaka (JP); Miyuki Yoshimoto, Osaka (JP); Koji Ogawa, Osaka (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 37 days.

(21) Appl. No.: 17/344,126

(22) Filed: Jun. 10, 2021

(65) Prior Publication Data

US 2021/0391583 A1 Dec. 16, 2021

(30) Foreign Application Priority Data

Jun. 11, 2020 (JP) ................................ 2020-101737

(51) Int. Cl.
| | | |
|---|---|---|
| *H01M 4/88* | (2006.01) | |
| *H01M 4/86* | (2006.01) | |
| *H01M 8/10* | (2016.01) | |
| *H01M 8/1004* | (2016.01) | |

(52) U.S. Cl.
CPC ....... *H01M 4/8807* (2013.01); *H01M 4/8652* (2013.01); *H01M 4/8817* (2013.01); *H01M 8/1004* (2013.01); *H01M 4/8663* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 2009/0155658 A1 | 6/2009 | Kotera et al. | |
| 2011/0207025 A1 | 8/2011 | Yamauchi et al. | |
| 2019/0224609 A1* | 7/2019 | Niki | B01D 39/1607 |
| 2019/0379064 A1* | 12/2019 | Kawashima | H01M 4/8626 |

FOREIGN PATENT DOCUMENTS

| | | |
|---|---|---|
| JP | 4938133 | 5/2012 |
| JP | 2015-22888 | 2/2015 |
| JP | 2015-32470 | 2/2015 |
| JP | 2015-99716 | 5/2015 |
| WO | 2009/075357 | 6/2009 |

OTHER PUBLICATIONS

Notification of Reasons for Refusal issued Mar. 5, 2024 in corresponding Japanese Patent Application No. 2020-101737, with Machine English Translation (10 pages).

* cited by examiner

*Primary Examiner* — Jonathan Crepeau
(74) *Attorney, Agent, or Firm* — Wenderoth, Lind & Ponack, L.L.P.

(57) ABSTRACT

A gas diffusion layer includes: a conductive particle; and a fluororesin, and the fluororesin includes a first fiber having a first average fiber diameter and a second fiber having a second average fiber diameter different from the first average fiber diameter.

13 Claims, 6 Drawing Sheets

Fig. 7
(TABLE 1)

| | | EXAMPLE | | | | | | | | COMPARATIVE EXAMPLE | | | |
|---|---|---|---|---|---|---|---|---|---|---|---|---|---|
| | | 1 | 2 | 3 | 4 | 5 | 6 | 7 | 8 | 1 | 2 | 3 | 4 |
| RAW MATERIAL | CONDUCTIVE PARTICLE 31 AB(wt%) | 0 | 0 | 0 | 90 | 90 | 90 | 0 | 80 | 0 | 90 | 0 | 80 |
| | KB(wt%) | 70 | 70 | 70 | 0 | 0 | 0 | 60 | 0 | 70 | 0 | 60 | 0 |
| | CONDUCTIVE FIBER 33 VGCF(wt%) | 0 | 0 | 0 | 0 | 0 | 0 | 10 | 10 | 0 | 0 | 10 | 10 |
| | FIRST FLUORORESIN PTFE DISPERSION (wt%) | 15 | 3 | 27 | 5 | 1 | 9 | 15 | 5 | 30 | 10 | 30 | 10 |
| | SECOND FLUORORESIN PTFE FINE POWDER (wt%) | 15 | 27 | 3 | 5 | 9 | 1 | 15 | 5 | 0 | 0 | 0 | 0 |
| | AVERAGE FIBER DIAMETER OF FIRST FIBER 32-f1 (μm) | 0.03 | 0.03 | 0.03 | 0.03 | 0.03 | 0.03 | 0.05 | 0.04 | 0.03 | 0.03 | 0.05 | 0.04 |
| | AVERAGE FIBER DIAMETER OF SECOND FIBER 32-f2 (μm) | 5 | 5 | 5 | 5 | 5 | 5 | 7 | 6 | - | - | - | - |
| | AVERAGE PARTICLE DIAMETER OF FLUORORESIN PARTICLES (μm) | - | - | 0.25 | - | - | 0.25 | - | - | 0.25 | 0.25 | 0.25 | 0.25 |
| EVALUATION | TENSILE FRACTURE STRENGTH (N/mm) | 0.31 | 0.43 | 0.23 | 0.33 | 0.41 | 0.26 | 0.33 | 0.34 | 0.16 | 0.18 | 0.17 | 0.18 |
| | CONTACT ANGLE (°) | 151 | 148 | 154 | 150 | 151 | 152 | 150 | 151 | 152 | 154 | 149 | 153 |

GAS DIFFUSION LAYER, MEMBRANE ELECTRODE ASSEMBLY, FUEL CELL, AND MANUFACTURING METHOD OF GAS DIFFUSION LAYER

CROSS-REFERENCE TO RELATED APPLICATIONS

This application claims a priority of Japanese Patent Application No. 2020-101737 filed on Jun. 11, 2020, the contents of which is incorporated herein by reference.

BACKGROUND

1. Technical Field

The technical field relates to a gas diffusion layer, a membrane electrode assembly, a fuel cell, and a manufacturing method of a gas diffusion layer.

2. Description of the Related Art

The gas diffusion layer has gas permeability and gas diffusivity, and is used for a fuel cell, for example. In a polymer electrolyte fuel cell, which is an example of a fuel cell, one surface of a hydrogen ion conductive polymer electrolyte membrane is exposed to a fuel gas such as hydrogen, and the other surface is exposed to oxygen, and water is synthesized by a chemical reaction via the electrolyte membrane, thereby electrically extracting reaction energy generated at that time.

A single cell of a polymer electrolyte fuel cell has a membrane electrode assembly (hereinafter referred to as "MEA") and a pair of conductive separators arranged on both sides of the MEA. The MEA includes a hydrogen ion conductive polymer electrolyte membrane and a pair of electrode layers sandwiching this electrolyte membrane. The pair of electrode layers have a catalyst layer formed on both surfaces of the polymer electrolyte membrane and composed mainly of carbon powder carrying a platinum group catalyst, and a gas diffusion layer formed on the catalyst layer and having both current collecting action, gas permeability, and water repellency.

The gas diffusion layer in the MEA uniformly supplies the gas supplied from the separator to the catalyst layer. The gas diffusion layer functions also as a conductive path for electrons between the catalyst layer and the separator. Therefore, a conductive porous member is sometimes used as the gas diffusion layer used in the MEA.

The gas diffusion layer in the MEA is required to have high water repellency so that excess water generated by the battery reaction in the catalyst layer is rapidly removed to discharge it out of the MEA system, and the pores of the gas diffusion layer are not blocked by the generated water. Therefore, a gas diffusion layer is generally used in which the conductive porous member is subjected to a water-repellent treatment with a fluororesin or the like, and the conductive base material on the side in contact with the catalyst layer is provided with a water-repellent layer composed mainly of carbon powder and a water-repellent resin such as a fluororesin.

U.S. Pat. No. 4,938,133 discloses a gas diffusion layer including a porous member composed mainly of a conductive particle and a polymer resin.

SUMMARY

However, the gas diffusion layer of U.S. Pat. No. 4,938,133 is weak in mechanical strength, and has a risk that the gas diffusion layer is broken by gas and water pressure. Therefore, it is required to increase the mechanical strength of the gas diffusion layer.

The present disclosure was conceived in view of the situations and it is therefore one non-limiting and exemplary embodiment provides a gas diffusion layer having excellent mechanical strength.

In one general aspect, the techniques disclosed here feature: a gas diffusion layer, includes:
  a conductive particle; and
  a fluororesin,
    wherein the fluororesin includes a first fiber having a first average fiber diameter and a second fiber having a second average fiber diameter different from the first average fiber diameter.

The present disclosure also provides a membrane electrode assembly, includes:
  the gas diffusion layer;
  a pair of electrodes; and
  an electrolyte membrane.

The present disclosure also provides a fuel cell, includes:
  the gas diffusion layer; and
  a current collection plate.

The present disclosure also provides a manufacturing method of a gas diffusion layer, includes:
  kneading a conductive particle, a first fluororesin having a first average particle diameter, and a second fluororesin having a second average particle diameter different from a first average particle diameter, and
  rolling the kneaded material to fiberize the first fluororesin and the second fluororesin.

According to the present disclosure, it is possible to provide a gas diffusion layer having excellent mechanical strength, and a membrane electrode assembly, and a fuel cell using the gas diffusion layer.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

BRIEF DESCRIPTION OF THE DRAWINGS

The present disclosure will become readily understood from the following description of non-limiting and exemplary embodiments thereof made with reference to the accompanying drawings, in which like parts are designated by like reference numeral and in which:

FIG. 7 is Table 1 showing raw material conditions and evaluation results in the examples 1 to 8 and the comparative examples 1 to 4.

DETAILED DESCRIPTION

Figure 1:
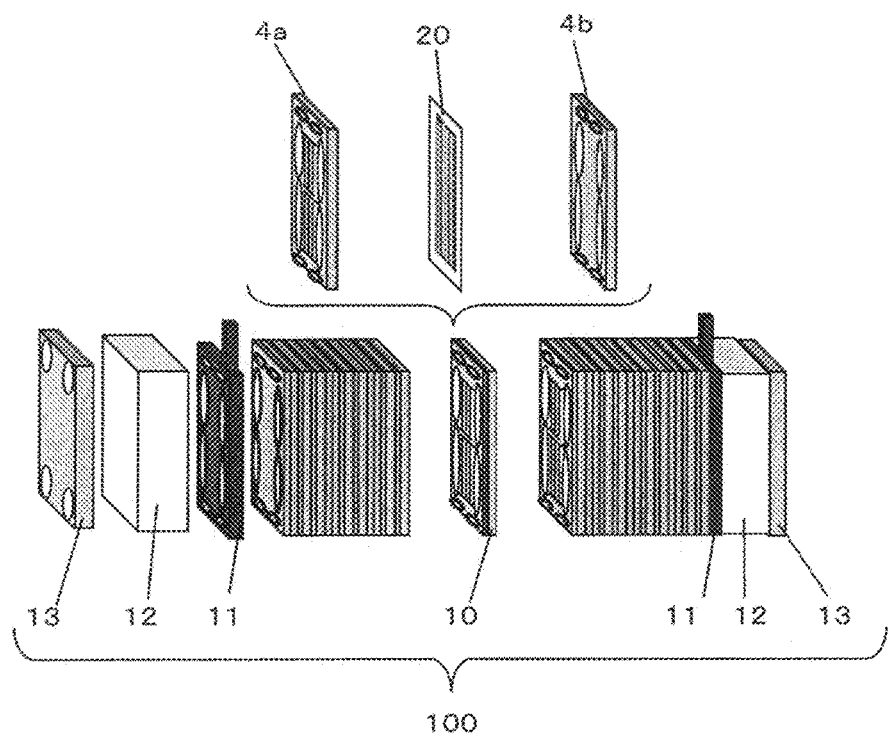
FIG. 1 is an outline view showing a configuration of a polymer electrolyte fuel cell stack according to a first embodiment of the present disclosure.

A gas diffusion layer according to a first aspect, includes:
a conductive particle; and
a fluororesin,
  wherein the fluororesin includes a first fiber having a first average fiber diameter and a second fiber having a second average fiber diameter different from the first average fiber diameter.

Further, as a gas diffusion layer of a second aspect, in the first aspect, the first average fiber diameter may be 10 nm or more and 100 nm or less, and
  the second average fiber diameter may be 0.5 μm or more and 50 μm or less.

Further, as a gas diffusion layer of a third aspect, in the first aspect, a proportion of the second fiber to the entire fluororesin may be 10 mass % or more and 90 mass % or less.

Further, as a gas diffusion layer of a fourth aspect, in the first aspect, further may include a conductive fiber.

Further, as a gas diffusion layer of a fifth aspect, in the first aspect, the fluororesin may include a particulate fluororesin.

Further, as a gas diffusion layer of a sixth aspect, in the fifth aspect, an average particle diameter of the particulate fluororesin may be 0.1 μm or more and 10 μm or less.

Further, as a gas diffusion layer of a seventh aspect, in the fifth aspect, a proportion of the particulate fluororesin to an entirety of the fluororesin may be 1 mass % or more and 50 mass % or less.

Further, as a gas diffusion layer of an eighth aspect, in the first aspect, the gas diffusion layer may have a porous structure including the conductive particle and the fluororesin.

Further, as a gas diffusion layer of a ninth aspect, in the first aspect, a tensile fracture strength of the gas diffusion layer may be 0.20 N/mm$^2$ or more.

Further, as a gas diffusion layer of a tenth aspect, in the first aspect, the gas diffusion layer may be a self-supporting film supported by the conductive particle and the fluororesin.

Further, as a gas diffusion layer of an eleventh aspect, in the first aspect, the fluororesin may include polytetrafluoroethylene (PTFE).

A membrane electrode assembly of twelfth aspect, includes: the gas diffusion layer of the first aspect;
  a pair of electrodes; and
  an electrolyte membrane.

A fuel cell of thirteenth aspect, includes:
  the gas diffusion layer of the first aspect; and
  a current collection plate.

A manufacturing method of a gas diffusion layer of fourteenth aspect, includes:
  kneading a conductive particle, a first fluororesin having a first average particle diameter, and a second fluororesin having a second average particle diameter different from a first average particle diameter, and
  rolling the kneaded material to fiberize the first fluororesin and the second fluororesin.

Further as a manufacturing method of a gas diffusion layer of fifteenth aspect, in the fourteenth aspect, the first average particle diameter may be 0.1 μm or more and 0.5 μm or less, and
  the second average particle diameter may be 1 μm or more and 1000 μm or less.

The gas diffusion layer, the membrane electrode assembly, the fuel cell, and the manufacturing method of the gas diffusion layer according to the embodiment of the present disclosure will be described below with reference to the drawings. In the drawings, substantially identical members are given identical reference numerals.

First Embodiment

A basic configuration of a fuel cell 100 according to the first embodiment of the present disclosure will be described with reference to FIG. 1. FIG. 1 is an outline view showing the configuration of the fuel cell (hereinafter, also referred to as a "polymer electrolyte fuel cell stack") 100 according to the first embodiment. The first embodiment is not limited to a polymer electrolyte fuel cell, and can be applied to various fuel cells.

<Fuel Cell>

As shown in FIG. 1, the fuel cell 100 is formed by laminating one or more battery cells 10, which are basic units, and compressing and fastening them with a predetermined load using current collection plates 11, insulating plates 12, and end plates 13 arranged on both sides of the laminated battery cells 10.

The current collection plate 11 is formed of a gas-impermeable conductive material. For example, copper, brass, or the like is used for the current collection plate 11. The current collection plate 11 is provided with a current drawing terminal (not illustrated), and current is drawn from the current drawing terminal during power generation.

The insulating plate 12 is formed of an insulating material such as resin. For example, a fluoropolymer, a PPS resin, or the like is used for the insulating plate 12.

The end plate 13 fastens and holds one or more laminated battery cells 10, the current collection plate 11, and the insulating plate 12 by a pressurization means (not illustrated) with a predetermined load. A highly-rigid metal material such as steel is used for the end plate 13.

<Battery Cell>

Figure 2:
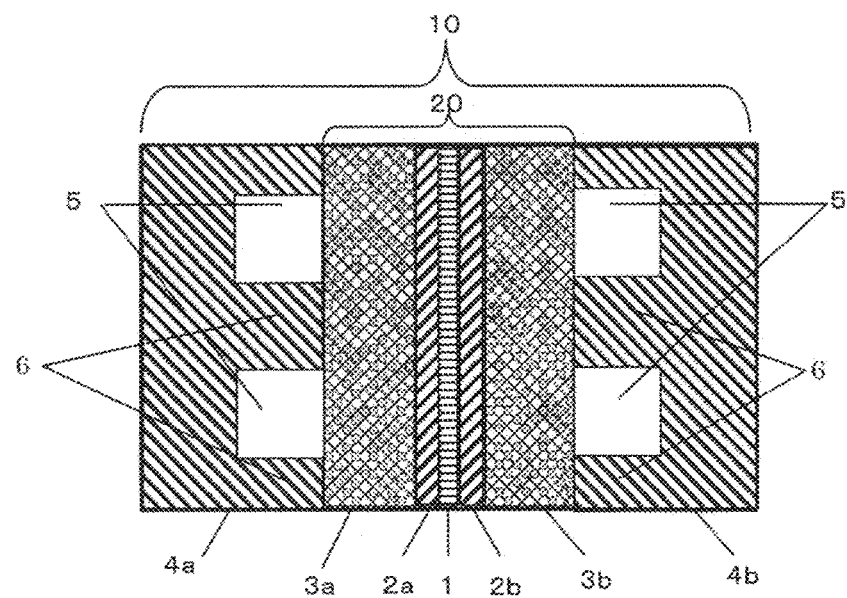
FIG. 2 is an outline cross-sectional view showing a configuration of a polymer electrolyte fuel cell according to an embodiment of the present disclosure.

FIG. 2 is an outline cross-sectional view showing the configuration of the battery cell 10. In the battery cell 10, a membrane electrode assembly (hereinafter also referred to as MEA) 20 is sandwiched between an anode-side separator 4a and a cathode-side separator 4b. Hereinafter, the anode-side separator 4a and the cathode-side separator 4b are collectively referred to as the separator 4. A similar description will be given to other components when a plurality of components are collectively described.

A fluid flow path 5 is formed in the separator 4. The fluid flow path 5 for fuel gas is formed in the anode-side separator 4a. The fluid flow path 5 for oxidant gas is formed in the cathode-side separator 4b. A carbon-based material and a metal-based material can be used for the separator 4.

The fluid flow path 5 is a groove portion formed in the separator 4. A rib portion 6 is provided around the fluid flow path 5.

<Membrane Electrode Assembly: MEA>

The membrane electrode assembly (MEA) 20 has a polymer electrolyte membrane 1, a catalyst layer 2, and a gas diffusion layer 3. An anode catalyst layer 2a and a cathode catalyst layer 2b (collectively, catalyst layer 2) are formed on both surfaces of the polymer electrolyte membrane 1 for selectively transporting hydrogen ions, and an anode-side gas diffusion layer 3a and a cathode-side gas diffusion layer 3b (collectively, gas diffusion layer 3) are arranged on the outside thereof, respectively.

For the polymer electrolyte membrane 1, for example, a perfluorocarbon sulfonic acid polymer is used, but is not particularly limited as long as it has proton conductivity.

For the catalyst layer 2, a layer including a carbon material carrying a catalyst particle such as platinum and a polymer electrolyte can be used.

<Gas Diffusion Layer>

Next, the structure of the gas diffusion layer 3 according to the first embodiment of the present disclosure will be described in detail with reference to FIGS. 3A and 3B.

Figure 3A:
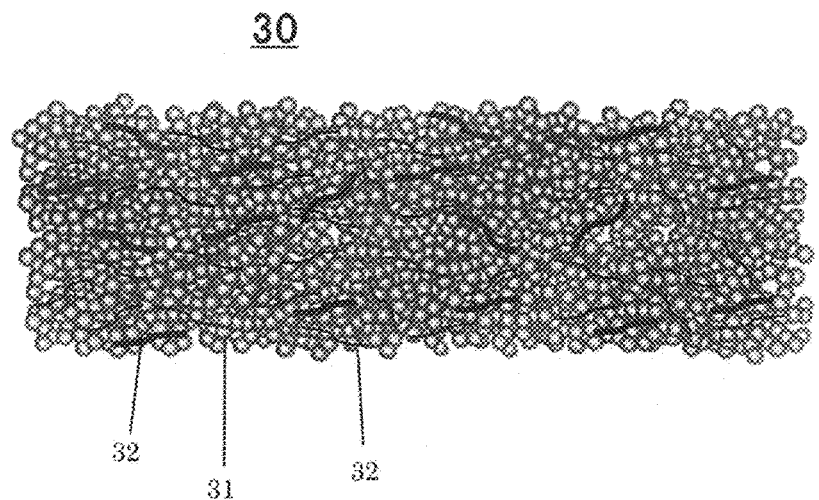
FIG. 3A is an outline schematic view of a gas diffusion layer according to the first embodiment of the present disclosure.

FIG. 3A is an outline schematic view of a porous structure 30 constituting the gas diffusion layer 3. FIG. 3B is a partially enlarged schematic view of the porous structure 30 constituting the gas diffusion layer 3. The porous structure 30 includes a conductive particle 31 and a fluororesin 32. That is, the gas diffusion layer 3 includes the conductive particle 31 and the fluororesin 32. In the first embodiment, as shown in FIG. 3A, the gas diffusion layer 3 includes the porous structure 30. The gas diffusion layer 3 is, for example, a self-supporting film supported by the conductive particle 31 and the fluororesin 32.

<Conductive Particle>

Examples of the conductive particle 31 include carbon materials such as carbon black, graphite, and activated carbon. The conductive particle 31, for example, includes carbon black having high conductivity and small primary particle diameter. Examples of carbon black used for the conductive particle 31 include acetylene black, Ketjenblack, furnace black, and Vulcan. It is particularly that the conductive particle 31 includes, for example, any of acetylene black having a small amount of impurities and Ketjenblack having a large specific surface area and high conductivity.

<Fluororesin>

Figure 3B:
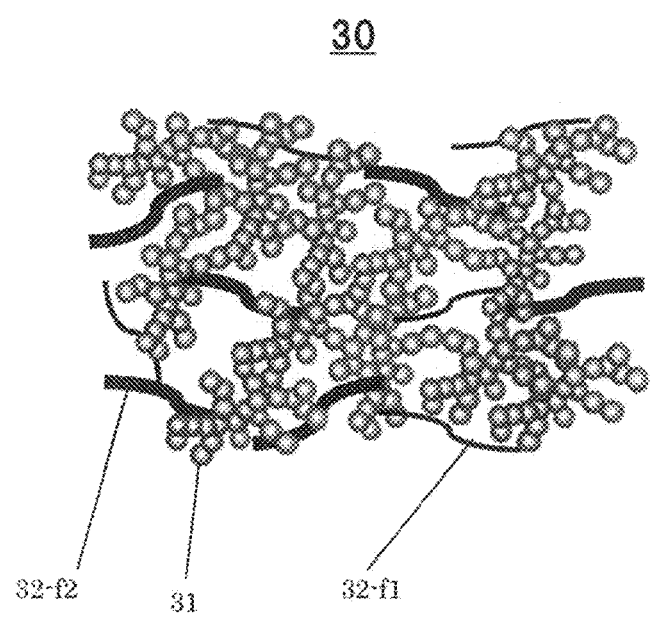
FIG. 3B is a partially enlarged schematic view of a cross section of the gas diffusion layer according to the first embodiment of the present disclosure.

As shown in FIG. 3B, the fluororesin 32 includes fluororesin fibers having different average fiber diameters, which are a fluororesin fiber (hereinafter, also referred to as "first fiber") 32-f1 having a small fiber diameter, and a fluororesin fiber (hereinafter, also referred to as "second fiber") 32-f2 having a large fiber diameter. Since the fluororesin 32 includes fluororesin fibers having different average fiber diameters, which are the first fiber 32-f1 having a small fiber diameter and the second fiber 32-f2 having a large fiber diameter, the gas diffusion layer 3 has excellent mechanical strength. This is considered to be because the first fiber 32-f1 having a small fiber diameter bind the conductive particle 31 and functions so as to prevent the conductive particle 31 from falling off from the porous structure 30, and the second fiber 32-f2 having a large fiber diameter contributes to improvement of the strength of the porous structure 30 itself.

Examples of the material of the fluororesin 32 include polytetrafluoroethylene (PTFE). PTFE has a property of becoming fibrous when shearing force is applied. In a mixing/dispersing step and a sheeting step in the manufacturing of the gas diffusion layer 3, a shearing force is applied to PTFE as a material, whereby the PTFE becomes fibrous. At this time, as a raw material form of PTFE, the PTFE dispersion having a small particle diameter becomes the first fiber 32-f1 having a small fiber diameter, and the PTFE powder having a large particle diameter becomes the second fiber 32-f2 having a large fiber diameter. Thus, use of PTFE allows the first fiber 32-f1 and the second fiber 3242 to be easily formed inside the gas diffusion layer 3 (porous structure 30). However, the material of the fluororesin 32 is not limited to PTFE, and a fluororesin capable of forming the first fiber and the second fiber is only required to be used. As the first fiber 32-f1 and the second fiber 32-f2, the same type of fluororesin may be used, or different types of fluororesin may be used. From the viewpoint of facilitating the manufacturing of the gas diffusion layer 3, the first fiber 32-f1 and the second fiber 32-f2 may be the same type of fluororesin. As the first fiber 32-f1, only one type of fluororesin may be used, or two or more types of different fluororesins may be used in combination. Similarly, as the second fiber 32-f2, only one type of fluororesin may be used, or two or more types of different fluororesins may be used in combination.

The average fiber diameter (first average fiber diameter) of the first fiber 32-f1 is, for example, 10 nm or more and 100 nm or less. The first average fiber diameter is 10 nm or more, whereby the binding force between the conductive particles 31 to each other becomes stronger, and the conductive particles 31 become less likely to fall off. The first average fiber diameter is 100 nm or less, whereby the first fiber can more favorably bind the conductive particle 31, and hence the bound conductive particles become less likely to fall off.

The average fiber diameter (second average fiber diameter) of the second fiber is, for example, 0.5 μm or more and 50 μm or less. The second average fiber diameter is 0.5 μm or more, whereby the strength of the gas diffusion layer 3 can be more sufficiently improved. The second average fiber diameter is 50 μm or less, whereby the number of fibers included in the gas diffusion layer 3 can be easily secured, and the strength of the gas diffusion layer can be improved more efficiently.

<Content of Conductive Particle and Fluororesin in Gas Diffusion Layer>

The proportion of the conductive particle 31 to the entire gas diffusion layer 3 is, for example, 60 mass % or more and 95 mass % or less. The proportion of the conductive particle 31 is 60 mass % or more, whereby the conductive particle 31 can be sufficiently present in the gas diffusion layer 3, and the conductivity of the gas diffusion layer 3 can be further enhanced. The proportion of the conductive particle 31 is 95 mass % or less, whereby the conductive particle 31 can be sufficiently bound by the fluororesin 32, and the strength of the gas diffusion layer 3 is further improved by the fluororesin 32.

The proportion of the fluororesin 32 to the entire gas diffusion layer 3 is, for example, 5 mass % or more and 40 mass % or less. The proportion of the fluororesin 32 is 5 mass % or more, whereby the function of binding the conductive particles 31 to each other is further improved, and the strength of the gas diffusion layer 3 is further enhanced. The proportion of the fluororesin 32 is 40 mass % or less, whereby the conductive particles 31 are sufficiently present in the gas diffusion layer 3, and hence the conductivity of the gas diffusion layer 3 is less likely to be lowered.

The proportion of the second fiber 32-f2 to the entire fluororesin 32 is, for example, 10 mass % or more and 90 mass % or less. The proportion of the fluororesin fiber 32-f2 having a large average fiber diameter included in the fluororesin 32 is 10 mass % or more, whereby the strength of the gas diffusion layer 3 can be further enhanced. The proportion of the fluororesin 32-f2 having a large average fiber diameter is 90 mass % or less, whereby the conductive particles 31 can be sufficiently bound to each other, thus the conductive particles 31 become less likely to fall off, and the durability of the gas diffusion layer 3 is further improved.

<Conductive Fiber>

Figure 4A:
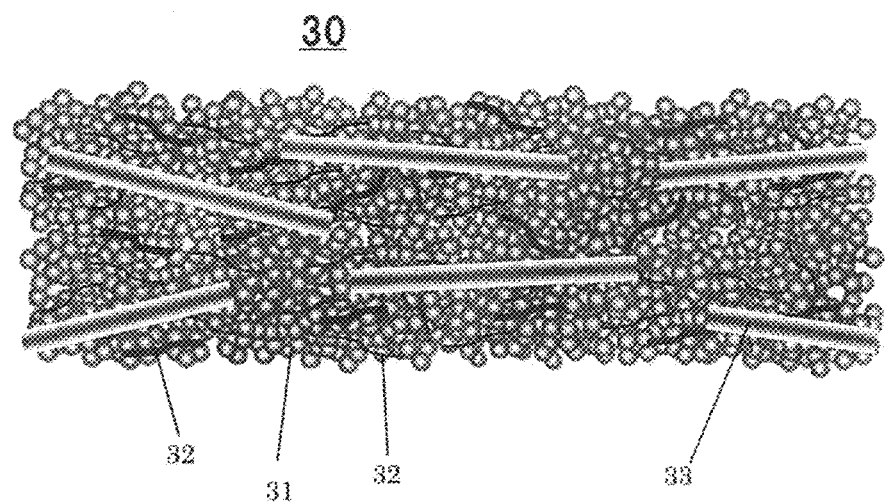
FIG. 4A is an outline schematic view of the gas diffusion layer according to the first embodiment of the present disclosure.
Figure 4B:
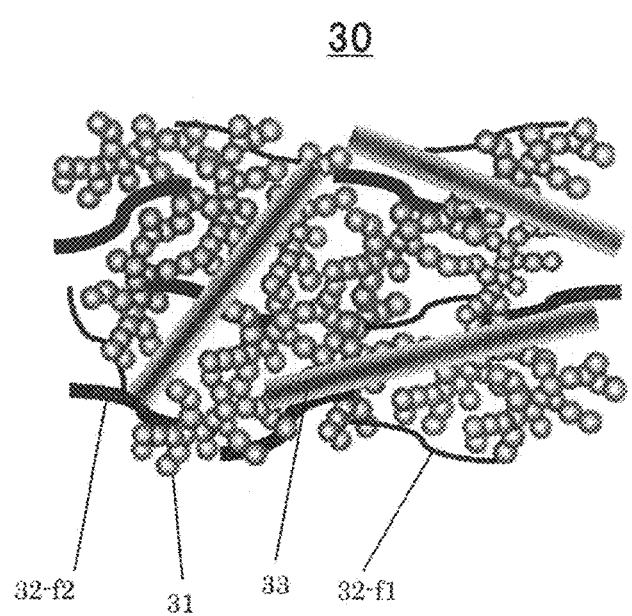
FIG. 4B is a partially enlarged schematic view of a cross section of the gas diffusion layer according to the first embodiment of the present disclosure.

The gas diffusion layer 3 may further include a conductive fiber 33. That is, the porous structure 30 constituting the gas diffusion layer 3 may further include the conductive fiber 33. FIG. 4A shows an outline schematic view of the porous structure 30 including the conductive fiber 33, and FIG. 4B shows a partially enlarged schematic view of the porous structure 30 of FIG. 4A. The gas diffusion layer 3 includes the conductive fiber 33, whereby the conductivity of the gas diffusion layer 3 is improved, as well as the gas diffusivity can be improved, and the mechanical strength of the gas diffusion layer 3 can be further enhanced.

When the porous structure 30 includes the conductive fiber 33, as shown in FIG. 4B, the first fiber 32-f1 and the second fiber 32-f2 not only bind the conductive particles 31 to each other but also function as a binder that binds the conductive fibers 33 to each other. Therefore, even when the gas diffusion layer 3 includes the conductive fiber 33, the strength of the gas diffusion layer 3 is enhanced by the first fiber 32-f1 and the second fiber 32-f2. In addition, since the conductive fiber 33 is also fibrous, it contributes to improvement of the mechanical strength of the gas diffusion layer 3.

The material of the conductive fiber 33 is not particularly limited, but for example, fibers such as carbon nanotubes can be used.

The average fiber diameter of the conductive fiber 33 is, for example, 50 nm or more and 300 nm or less. The average fiber diameter of the conductive fiber 33 is 50 nm or more, whereby it effectively contributes to improvement of the conductivity of the gas diffusion layer 3, and the mechanical strength of the gas diffusion layer 3 can be further enhanced. The average fiber diameter of the conductive fiber 33 is 300 nm or less, whereby the diameter does not become too large, thus the pore volume in the porous structure 30 can be easily secured sufficiently, and the gas diffusivity of the gas diffusion layer 3 can be further enhanced.

The average fiber length of the conductive fiber 33 is, for example, 1 μm or more and 50 μm or less. The average fiber length of the conductive fiber 33 is 1 μm or more, whereby it effectively contributes to improvement of the conductivity of the gas diffusion layer 3, and the mechanical strength of the gas diffusion layer 3 can be further enhanced. The average fiber length of the conductive fiber 33 is 50 μm or less, whereby the fiber does not become too long, thus the pore volume in the porous structure 30 can be easily secured sufficiently, and the gas diffusivity of the gas diffusion layer 3 can be further enhanced.

<When Conductive Fiber is Included: Content of Conductive Particle, Conductive Fiber, and Fluororesin in Gas Diffusion Layer>

When the gas diffusion layer 3 includes the conductive fiber 33, the proportion of the conductive particle 31 to the entire gas diffusion layer 3 is, for example, 5 mass % or more. The proportion of the conductive particle 31 is 5 mass % or more, whereby the sufficient conductive particle 31 is present in the gas diffusion layer 3, and the conductivity of the gas diffusion layer 3 can be further improved.

When the gas diffusion layer 3 includes the conductive fiber 33, the proportion of the conductive fiber 33 to the entire gas diffusion layer 3 is, for example, 90 mass % or less. The proportion of the conductive fiber 33 is 90 mass % or less, whereby the conductive fiber 33 can be more favorably bound by the fluororesin 32, and hence the mechanical strength of the gas diffusion layer 3 can be further enhanced.

When the gas diffusion layer 3 includes the conductive fiber 33, the proportion of the fluororesin 32 to the entire gas diffusion layer 3 is, for example, 5 mass % or more and 40 mass % or less. The proportion of the fluororesin 32 is 5 mass % or more, whereby the conductive particles 31 can be more favorably bound to each other and the conductive fibers 33 can be more favorably bound to each other, and the strength of the gas diffusion layer 3 can be further improved. The proportion of the fluororesin 32 is 40 mass % or less, whereby the proportion of the conductive particle 31 and the conductive fiber 33 in the gas diffusion layer 3 can be sufficiently secured, and hence the gas diffusion layer 3 can have more excellent conductivity. Note that the proportion of the second fiber 32-f2 to the entire fluororesin 32 is, for example, 10 mass % or more and 90 mass % or less.

<Fluororesin Particle>

Figure 5A:
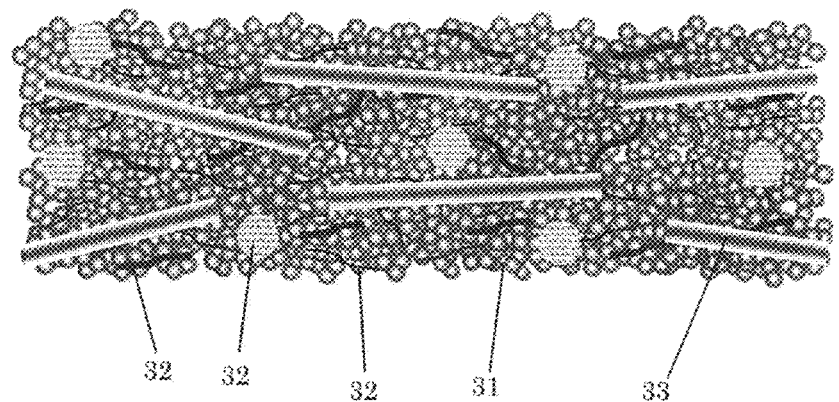
FIG. 5A is an outline schematic view of the gas diffusion layer according to the first embodiment of the present disclosure.
Figure 5B:
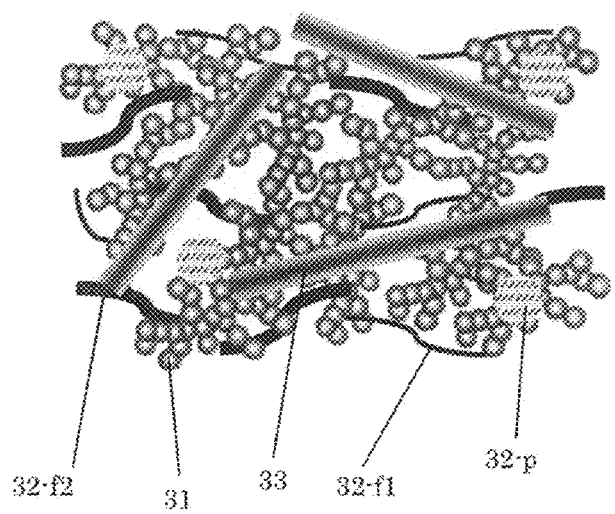
FIG. 5B is a partially enlarged schematic view of a cross section of the gas diffusion layer according to the first embodiment of the present disclosure.

The gas diffusion layer 3 may further include a particulate fluororesin (hereinafter also referred to as "fluororesin particle") 32-p. That is, the porous structure 30 constituting the gas diffusion layer 3 may further include the particulate fluororesin 32-p. In other words, the fluororesin 32 may include the particulate fluororesin 32-p in addition to the first fiber 32-f1 and the second fiber 32-f2. FIG. 5A shows an outline schematic view of the porous structure 30 including the fluororesin particle 32-p, and FIG. 5B shows a partially enlarged schematic view of the porous structure 30 of FIG. 5A. Note that FIGS. 5A and 5B show an aspect in which the porous structure 30 includes the conductive particle 31, the first fiber 32-f1, the second fiber 32-f2, the conductive fiber 33, and the fluororesin particle 32-p. However, the present disclosure is not limited to this. For example, the porous structure 30 may include the conductive particle 31, the first fiber 32-f1, the second fiber 32-f2, and the fluororesin particle 32-p, and may not include the conductive fiber 33.

When the gas diffusion layer 3 includes the fluororesin particle 32-p, the gas diffusion layer 3 has the particulate fluororesin 32-p remaining as a particle, in addition to the first fiber 32-f1 binding the conductive particles 31 to each other and the conductive fibers 33 to each other to prevent them from falling off and the second fiber 32-f2 improving the strength. Since the fluororesin particle 32-p have higher water repellency in the vicinity of the particle than the fibrous fluororesins 32-f1 and 32-f2 have, it is possible to prevent water from retaining in the pores present inside the gas diffusion layer 3 and from inhibiting gas permeation.

The material of the fluororesin particle 32-p is not particularly limited, and the same type of fluororesin as any or both of the first fiber 32-f1 and the second fiber 32-f2 may be used, or different types of fluororesin may be used. From the viewpoint of facilitating the manufacturing of the gas diffusion layer 3, the first fiber 32-f1, the second fiber 32-f2, and the fluororesin particle 32-p may be the same type of fluororesin. As the fluororesin particles 32-p, only one type of fluororesin may be used, or two or more types of different fluororesins may be used in combination.

The average particle diameter of the fluororesin particle 32-p is, for example, 0.1 μm or more and 10 μm or less. Both the short diameter and the long diameter of the fluororesin particle 32-p are, for example, in the range of 0.1 μm or more and 10 μm or less. The average particle diameter of the fluororesin particle 32-p is 0.1 μm or more, whereby manufacturing becomes easy. The average particle diameter of the fluororesin particle 32-p is 10 μm or less, whereby the conductivity becomes less likely to decrease, and hence the conductivity of the gas diffusion layer 3 can be improved.

The proportion of the particulate fluororesin 32-*p* to the entire fluororesin 32 is, for example, 1 mass % or more and 50 mass % or less. The proportion of the fluororesin particle 32-*p* is 1 mass % or more, whereby the water repellency in the gas diffusion layer 3 can be favorably increased, and hence it is possible to prevent the gas permeability from being lowered due to the retention of water. The proportion of the fluororesin particle 32-*p* is 50 mass % or less, whereby the first fiber 32-*f*1 and the second fiber 32-*f*2 are sufficiently present in the gas diffusion layer 3. It is possible to more favorably bind the conductive particles 31 to each other and the conductive fibers 33 to each other, and it is possible to enhance the mechanical strength of the gas diffusion layer 3.

The tensile fracture strength of the gas diffusion layer 3 is, for example, 0.20 N/mm$^2$ or more. The tensile fracture strength of the gas diffusion layer 3 is 0.20 N/mm$^2$ or more, whereby the gas diffusion layer 3 becomes less likely to fracture at the time of swelling-shrinking of the polymer electrolyte membrane 1, the gas pressure, and discharge of the generated water, and the durability of the MEA 20 can be further improved. Such tensile fracture strength can be achieved when the gas diffusion layer 3 includes the first fiber 32-*f*1 and the second fiber 32-*f*2.

<Manufacturing Method of Gas Diffusion Layer>

Next, the manufacturing method of the gas diffusion layer 3 according to the first embodiment of the present disclosure will be described. The manufacturing method of the gas diffusion layer 3 according to the first embodiment of the present disclosure includes kneading the conductive particle 31, a first fluororesin having a first average particle diameter, and a second fluororesin having a second average particle diameter different from the first average particle diameter, and rolling the kneaded material to fiberize the first fluororesin and the second fluororesin. The first fluororesin is fiberized to form the first fiber 3241. The second fluororesin is fiberized to form the second fiber 32-*f*2. This makes it possible to obtain the gas diffusion layer 3 including the first fiber 32-*f*1 and the second fiber 32-*f*2, having different average fiber diameters.

Figure 6:
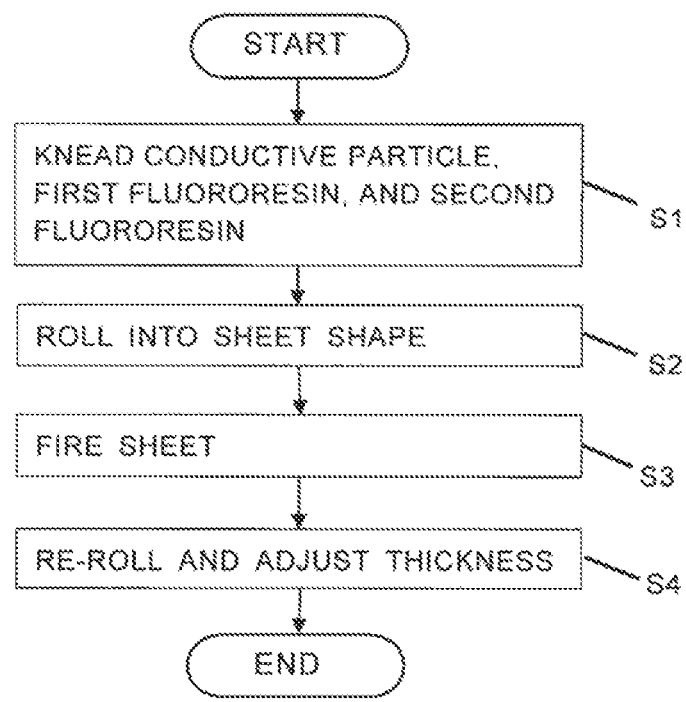
FIG. 6 is a flowchart showing a manufacturing method of the gas diffusion layer according to the first embodiment of the present disclosure.

The manufacturing method of the gas diffusion layer 3 according to the first embodiment will be described in detail with reference to FIG. 6. FIG. 6 is a flowchart of the manufacturing method of the gas diffusion layer 3. The manufacturing method of the gas diffusion layer 3 according to the present disclosure is not limited to that in the flowchart of FIG. 6 and the manufacturing method described later, and may be changed within a range not departing from the gist of the present disclosure.

(1) In step S1, the conductive particle 31, the first fluororesin, the second fluororesin, a surfactant, and a dispersion solvent are kneaded. First, the conductive particle 31 such as a carbon material, the conductive fiber 33 such as a carbon nanotube where necessary, the surfactant, and the dispersion solvent are poured, agitated, and kneaded. After that, the first fluororesin and the second fluororesin are poured, and agitated and kneaded again to obtain a kneaded material.

A discretionary material may be used as the first fluororesin. For example, a dispersion of fluororesin can be used. In the present embodiment, a PTFE dispersion is used.

The average particle diameter of the first fluororesin (hereinafter also referred to as the first average particle diameter) is, for example, 0.1 μm or more and 0.5 μm or less. In this case, the first fluororesin is fiberized into the first fiber 32-*f*1 having a small fiber diameter in the rolling step described later.

A discretionary material may be used as the second fluororesin. For example, fluororesin powder can be used. In the present embodiment, PTFE fine powder is used.

The average particle diameter of the second fluororesin (hereinafter also referred to as the second average particle diameter) is, for example, 1 μm or more and 1000 μm or less. In this case, the second fluororesin is fiberized into the second fiber 32-*f*2 having a large fiber diameter in the rolling step described later.

For example, a planetary mixer, a rotation-revolution mixer, a kneader, a roll mill, and the like can be used for kneading the materials in step S1. In step S1, which is the kneading step, the conductive particle 31, the conductive fiber 33, the surfactant, and the dispersing solvent are kneaded and dispersed first, and then the first fluororesin and the second fluororesin are poured and agitated, whereby the fluororesin 32 can be brought into a state of being uniformly dispersed in the kneaded material.

(2) In step S2, the kneaded material is rolled into a sheet shape. For example, a mill roller can be used for the rolling in step S2. For example, the first fluororesin and the second fluororesin are fiberized by applying shearing force by performing rolling once or a plurality of times with the pressure of 0.001 ton/cm or more and 4 ton/cm or less as the condition of rolling. At this time, as mentioned earlier, the fluororesin dispersion having a small average particle diameter becomes the first fiber 32-*f*1 having a small fiber diameter, and the fluororesin powder having a large average particle diameter becomes the second fiber 32-*f*2 having a large fiber diameter. Thus, the fluororesin fiber 32-*f*1 having a small fiber diameter and the fluororesin fiber 32-*f*2 having a large fiber diameter are formed inside the gas diffusion layer 3 (porous structure 30). By adjusting the pressure and the number of times at which the kneaded material is rolled, a part of the first fluororesin in the fluororesin dispersion is not fiberized and remains as the fluororesin particle 32-*p*.

(3) In step S3, the kneaded material rolled into a sheet shape is fired to remove the surfactant and the dispersion solvent from the kneaded material.

In the firing in step S3, an IR furnace, a hot-air drying furnace, or the like can be used. The firing temperature is set higher than the temperature at which the surfactant decomposes and lower than the temperature at which the fluororesin 32 melts. The reason is as follows. When the firing temperature is lower than the temperature at which the surfactant decomposes, the surfactant remains inside the gas diffusion layer 3, and water tends to retain because the inside of the gas diffusion layer 3 becomes hydrophilic, and hence there is a risk that the gas permeability of the gas diffusion layer 3 is lowered. On the other hand, when the firing temperature is higher than the melting point of the fluororesin 32, the fluororesin 32 melts, and hence there is a risk that the strength of the gas diffusion layer 3 is lowered. Specifically, for example, when PTFE is used as the fluororesin 32, the firing temperature is, for example, 280° C. or more and 340° C. or less.

(4) In step S4, the sheet-shaped kneaded material from which the surfactant and the dispersion solvent have been removed is re-rolled by a roll press machine to adjust the thickness. Thus, the gas diffusion layer 3 according to the embodiment of the present disclosure can be manufactured.

For example, a roll press machine can be used for the re-rolling in step S4. For example, the thickness and porosity of gas diffusion layer 3 can be adjusted by performing re-rolling once or a plurality of times with the pressure of 0.01 ton/cm or more and 4 ton/cm or less as the condition of roll press. The present disclosure is not limited to the above embodiment but can be implemented in various other aspects.

EXAMPLES

Examples of the present disclosure will be described below. The following materials were used, and evaluations were performed in the following manner.

[Conductive Particle 31] Acetylene Black (hereinafter, AB) (Denka Black Powder, manufactured by Denki Kagaku Kogyo), Ketjenblack (hereinafter, KB) (ECP300, manufactured by Lion)

[Conductive Fiber 33] VGCF (VGCF-H, manufactured by Showa Denko)

[Fluororesin Dispersion] PTFE Dispersion (manufactured by Daikin), Average Particle Diameter 0.25 μm

[Fluororesin Powder] PTFE Fine Powder (manufactured by Daikin), Average Particle Diameter 550 μm (Manufacturing of Gas Diffusion Layer of Examples and Comparative Examples)

The gas diffusion layers of the examples 1 to 8 and the comparative examples 1 to 4 were manufactured as follows. First, the conductive particle, the conductive fiber, the surfactant, and the dispersion solvent were blended in the proportion shown in the raw material column of Table 1, and then kneaded using a planetary mixer. Next, fluororesin dispersion (first fluororesin) and fluororesin powder (second fluororesin) were added to the kneaded material in the proportion shown in the raw material column of Table 1, and further kneaded using the planetary mixer. The kneaded material was then rolled five times using a mill roller under a rolling condition of 0.1 ton/cm. After that, the rolled sheet was placed in the IR furnace and fired at 300° C. for 0.5 hours. The fired sheet was re-rolled thrice using a roll press machine under a rolling condition of 1 ton/cm, and a gas diffusion layer having a thickness of 100 μm was obtained.

(Evaluation Test)

In the examples 1 to 8 and the comparative examples 1 to 4, the average fiber diameter of PTFE fibers (first fibers) 32-f1 having a small fiber diameter in the cross section of the gas diffusion layer, the average fiber diameter of PTFE fibers (second fibers) 32-f2 having a large fiber diameter in the cross section of the gas diffusion layer, the average particle diameter of PTFE particles (fluororesin particles) 32-p in the cross section of the gas diffusion layer, the tensile fracture strength of the gas diffusion layer, and the contact angle of the gas diffusion layer were measured. The raw material conditions and evaluation results in the examples 1 to 8 and the comparative examples 1 to 4 are shown in Table 1 in FIG. 7.

The average fiber diameters of the first fibers 32-f1 and the second fibers 32-f2 were measured by the following method. First, the gas diffusion layer was cut, the cross section was polished by ion milling, and then the cross section was photographed by SEM or an optical microscope. Next, in the cross-sectional photograph, the fiber diameters of the first fibers 32-f1 and the second fibers 32-f2 were measured, and an average value by the number average were calculated.

The average particle diameter of the fluororesin particles 32-p was obtained by measuring the particle diameter of the fluororesin particles in the cross-sectional photograph taken by the method described above, and calculating the average value by the number average.

As for the tensile fracture strength, the gas diffusion layer was punched out of a dumbbell specimen (dumbbell-shaped No. 4) specified by JIS K6251 using a Thomson die, and the tensile fracture strength was measured by a tensile compression tester (SVZ-200NB, manufactured by Imada SS).

As for the contact angle, the static contact angle with respect to pure water was measured by a portable contact angle meter (PG-X, manufactured by Matsubo).

Table 1 in FIG. 7 indicates that the gas diffusion layer of the examples 1 to 8 including both the first fiber 32-f1 and the second fiber 32-f2 has a higher tensile fracture strength than that of the gas diffusion layer of the comparative examples 1 to 4 that does not include the second fiber.

The present disclosure includes combination of any embodiment and/or example of the above-described various embodiments and/or examples as appropriate, and can achieve the effect each embodiment and/or example has.

The gas diffusion layer according to the present disclosure is particularly useful as a member used in a fuel cell, and can be applied to applications such as a home cogeneration system, an automobile fuel cell, a mobile fuel cell, and a backup fuel cell.

EXPLANATIONS OF LETTERS OR NUMERALS

100 fuel cell
1 polymer electrolyte membrane
2 catalyst layer
2a anode catalyst layer
2b cathode catalyst layer
3 gas diffusion layer
3a anode-side gas diffusion layer
3b cathode-side gas diffusion layer
4 separator
4a anode-side separator
4b cathode-side separator
5 fluid flow path
6 rib portion
10 battery cell
11 current collection plate
12 insulating plate
13 end plate
20 membrane electrode assembly
30 porous structure
31 conductive particle
32 fluororesin
32-f1 first fiber
32-f2 second fiber
32-p fluororesin particle
33 conductive fiber

What is claimed is:

1. A gas diffusion layer, comprising:
   a first fiber consisting of fluororesin having a first average fiber diameter;
   a second fiber consisting of fluororesin having a second average fiber diameter different from the first average fiber diameter;
   a conductive particle; and
   a particulate fluororesin,
   wherein the first average fiber diameter is 10 nm or more and 100 nm or less, and the second average fiber diameter is 0.5 μm or more and 50 μm or less.

2. The gas diffusion layer according to claim 1, wherein a proportion of the second fiber consisting of fluororesin to an entirety of the first fiber consisting of fluororesin and the second fiber consisting of fluororesin is 10 mass % or more and 90 mass % or less.

3. The gas diffusion layer according to claim 1, further comprising:
a conductive fiber.

4. The gas diffusion layer according to claim 1, wherein an average particle diameter of the particulate fluororesin is 0.1 μm or more and 10 μm or less.

5. The gas diffusion layer according to claim 1, wherein a proportion of the particulate fluororesin to an entirety of the first fiber consisting of fluororesin, the second fiber consisting of fluororesin, and the particulate fluororesin is 1 mass % or more and 50 mass % or less.

6. The gas diffusion layer according to claim 1, wherein the gas diffusion layer has a porous structure including the conductive particle and the fluororesin.

7. The gas diffusion layer according to claim 1, wherein a tensile fracture strength of the gas diffusion layer is 0.20 N/mm$^2$ or more.

8. The gas diffusion layer according to claim 1, wherein the gas diffusion layer is a self-supporting film supported by the conductive particle and the fluororesin.

9. The gas diffusion layer according to claim 1, wherein the fluororesin includes polytetrafluoroethylene (PTFE).

10. A membrane electrode assembly, comprising:
a gas diffusion layer, comprising
a first fiber consisting of fluororesin having a first average fiber diameter,
a second fiber consisting of fluororesin having a second average fiber diameter different from the first average fiber diameter, and
a conductive particle,
wherein the first average fiber diameter is 10 nm or more and 100 nm or less, and the second average fiber diameter is 0.5 μm or more and 50 μm or less;
a pair of electrodes; and
an electrolyte membrane.

11. A fuel cell, comprising:
a gas diffusion layer, comprising
a first fiber consisting of fluororesin having a first average fiber diameter,
a second fiber consisting of fluororesin having a second average fiber diameter different from the first average fiber diameter, and
a conductive particle,
wherein the first average fiber diameter is 10 nm or more and 100 nm or less, and the second average fiber diameter is 0.5 μm or more and 50 μm or less; and
a current collection plate.

12. A manufacturing method of a gas diffusion layer, the gas diffusion layer comprising:
a first fiber consisting of fluororesin having a first average fiber diameter;
a second fiber consisting of fluororesin having a second average fiber diameter different from the first average fiber diameter;
a conductive particle; and
a particulate fluororesin,
wherein the first average fiber diameter is 10 nm or more and 100 nm or less, and the second average fiber diameter is 0.5 μm or more and 50 μm or less,
the method comprising:
kneading the conductive particle, a first fluororesin having a first average particle diameter, and a second fluororesin having a second average particle diameter different from the first average particle diameter; and
rolling the kneaded material to fiberize the first fluororesin and the second fluororesin to form the first fiber and the second fiber, respectively.

13. The manufacturing method of a gas diffusion layer according to claim 12, wherein the first average particle diameter is 0.1 μm or more and 0.5 μm or less, and
the second average particle diameter is 1 μm or more and 1000 μm or less.

* * * * *